UNITED STATES PATENT OFFICE.

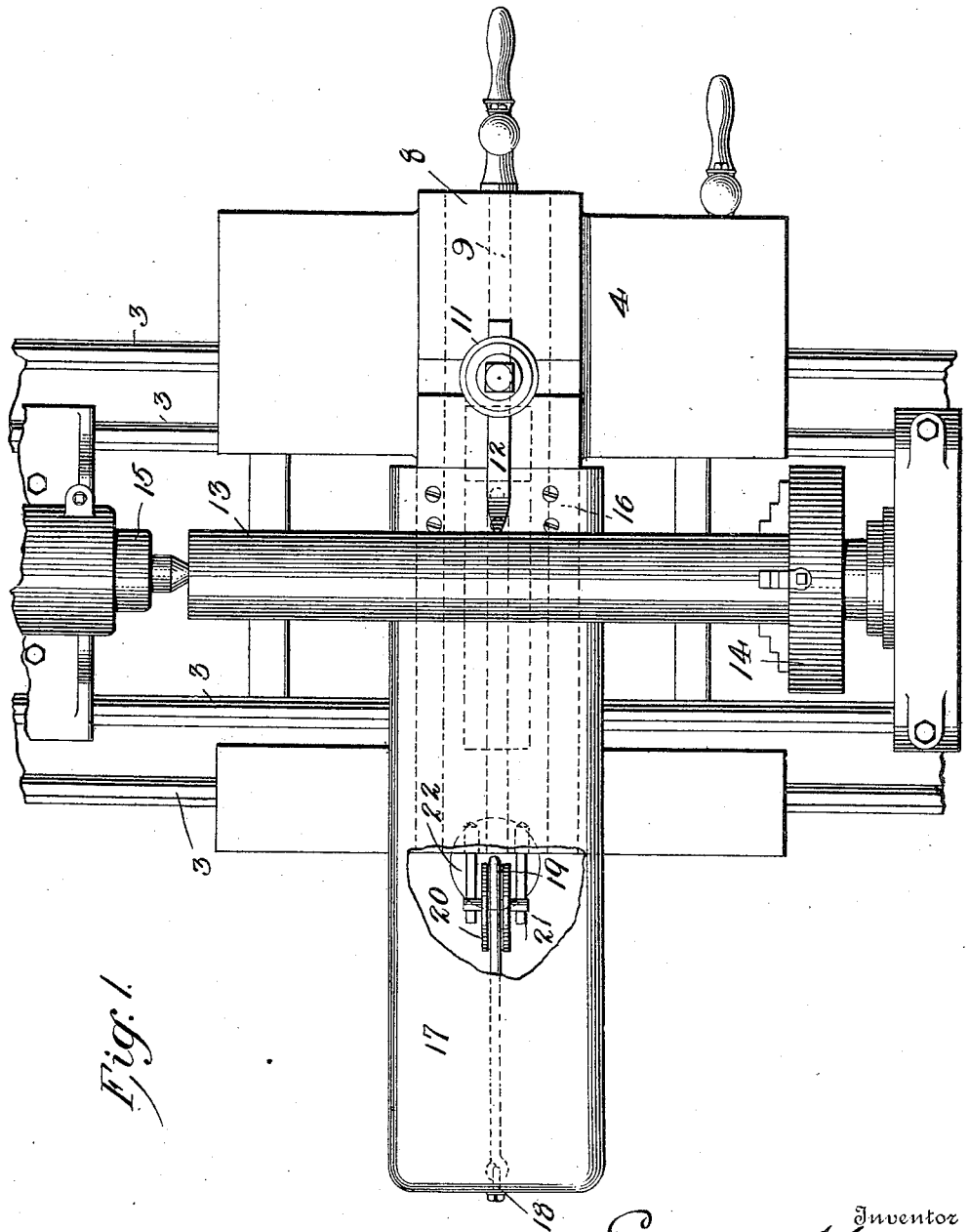

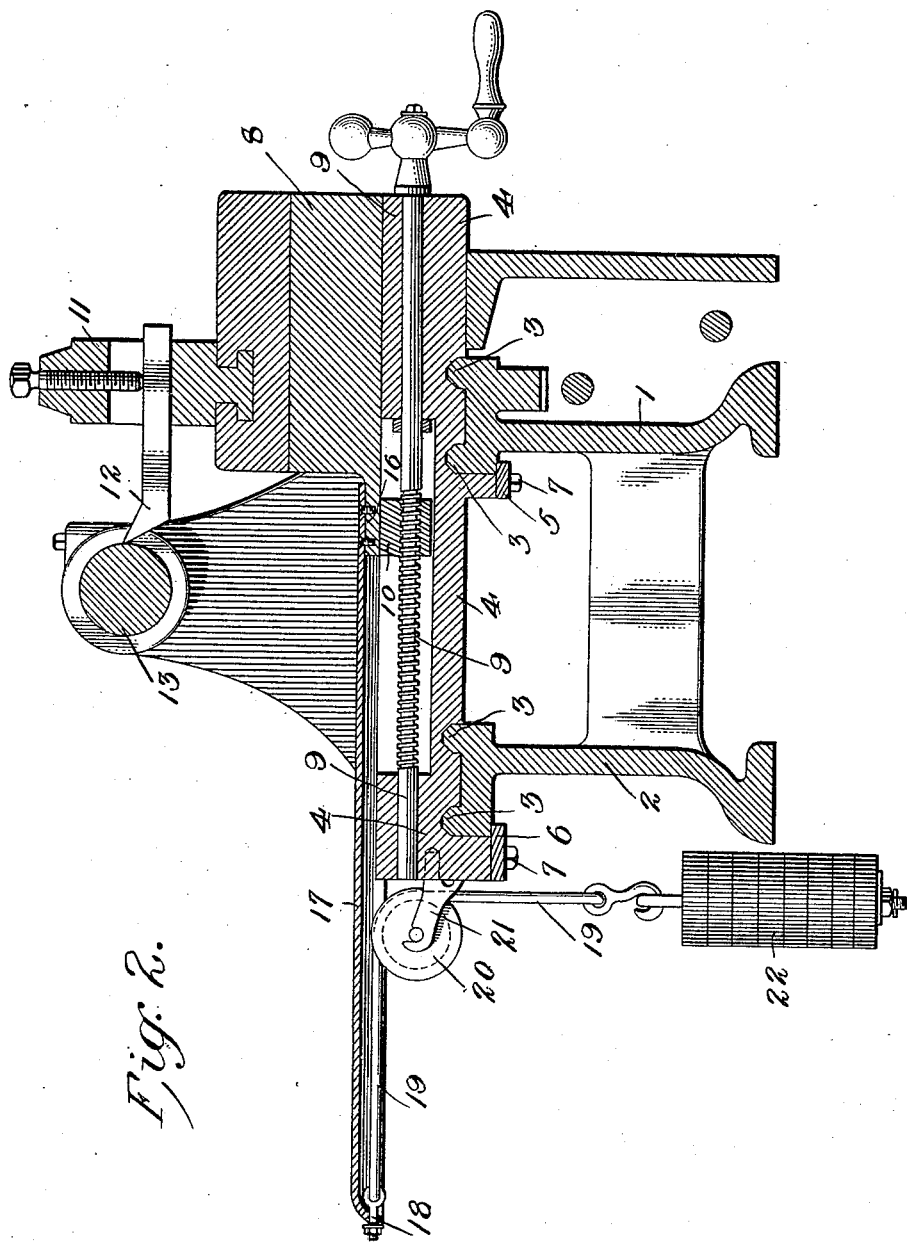

EBENEZER FISHER, OF EGG HARBOR, NEW JERSEY.

TOOL ADJUSTMENT FOR LATHES.

1,122,713.   Specification of Letters Patent.   Patented Dec. 29, 1914.

Application filed October 11, 1910, Serial No. 586,566. Renewed May 27, 1914. Serial No. 841,368.

*To all whom it may concern:*

Be it known that I, EBENEZER FISHER, a subject of the King of Great Britain, residing at Egg Harbor, in the State of New Jersey, have invented new and useful Improvements in Tool Adjustments for Lathes, of which the following is a specification.

My invention relates generally to the tool feed of lathes, and its object is to provide a simple means to be attached to the lathe that will set upon the tool carriage at all times to prevent lost motion in the parts and the consequent movement of the cutting tool from its adjusted position.

It is well known that the lost motion in the cutter adjusting and carrying parts of lathes, which is present even in new lathes though in greater degree in lathes than have had much use, renders it impossible to give to the tool such adjustment as would make it practicable to rely on any adjustment thereof for turning the work down to its final dimensions, and hence the universal practice of making allowance in the cutting for the variation that will occur from the presence of lost motion and the subsequent resort to filing or other finishing cutting to secure accuracy in the work. As is well known this lost motion in being communicated to the cutting tool results not only in the retreat of the tool from its position of adjustment by reason of the pressure of the work thereon, but produces the common fault of "grabbing", which is the pulling forward of the tool by the work under the many conditions of operation with the result of too deep cutting.

My invention therefore consists in eliminating the lost motion above-referred to by placing the tool carrying parts of the lathe under resistance that will operate automatically in opposition to the feed, and preferably is practised by the application of a weight and a suitable supporting connection combined with both the longitudinal and the transverse carriage of the lathe so that the weight will be supported from these combined parts and moving longitudinally of the lathe therewith and applying its gravity to the transversely moving carriage against its advance movement and keep the same forced back with relation to the operating parts, so that the necessary looseness of play between the carriage and said parts will not effect the definite adjustment of the tool, while a constant force is also applied upon one side of the longitudinally moving carriage to bind it more firmly to the lathe bed and prevent lost motion thereon that would be imparted to the tool.

The invention further consists in certain other novel features in the construction and arrangement of parts all as hereinafter described, and fully set forth in the appended claims.

In the accompanying drawings, Figure 1, is a top or plan view of a portion of a lathe, showing the tool carriage, the tool and the work, and Fig. 2, a transverse vertical section on the line $x$—$x$ of Fig. 1.

Referring to the drawings, in which is shown the common type of lathe construction, 1 and 2 designate the beams of the lathe bed, which are provided with the guide ribs 3 on which is supported to slide thereon the longitudinally moving carriage 4. This carriage is provided with the embracing parts 5 and 6 for engaging an undersurface of the lathe bed for placing the carriage under a seating pressure through the adjustment of their set screws 7. The carriage 4 is provided as usual with carriage 8, which has transverse movement thereon and is operated by the feed screw 9 mounted in the carriage 4 and working within the threaded projection or nut 10 depending from the transverse carriage. Mounted on the transverse carriage is the tool post 11 which may be on any desired construction and which in present instance is shown provided with a cutting tool 12 in cutting position on the shaft 13 held for rotation in the lathe by the chuck 14 and the tail 15.

With the above approved construction in view it may be premised that the looseness between the threads of the nut 10 and the feed screw 9 and the looseness occasioned by the slight longitudinal play of the said feed screw in its end-bearings, which looseness at both points indicated is present in all lathes employing this universal type of feed, is also imparted to the tool so that whatever adjustment is made it will be subject to variation caused by this looseness or lost motion, and this lost motion will generally be more pronounced at the tool point because of its position and the association with it of other parts. Further variation in the tool will also be present from any lost motion in the longitudinal carriage on its guide ribs 3 which motion will be manifested in either a vertical or torsional movement. It will be seen that to place these elements of the lathe that are subject to lost motion under a resistance that will be constantly applied without interfering with the feeding operation, there has been secured to the transverse carriage 8 at the point 16 a laterally extending piece 17 which is practically an extension of the hood now commonly employed to protect the feed from the lathe cuttings, but which extends out beyond the lathe at the rear substantially the distance of the cross-feed motion. To a fixture 18 in the outer end of the said extension piece 17 there is secured a small cable or chain 19 which is carried back parallel to the extension and passes over a wheel or guide roller 20 supported on the bracket arms 21 at their outer ends, which bracket arms are located on the rear face of the carriage 4. Passing down from the roller the cable or chain is provided with a weight 22 made up, as shown in the present instance of a series of weights. This weight 22 can be varied to suit the different sizes of lathes but in practice it has been found desirable to employ seventy five to one hundred pounds for the machine lathe of common shop use.

The operation of the weight in applying a constant resistance to make definite any adjustment will be readily understood. The pull of the weight against the transverse carriage is always in opposition to the feed and it forces the feed-screw nut 10 to bear rearwardly on the feed-screw's threads with a pressure equal to the weight and also resist any pulling forward of the carriage allowed by the lost motion present in the parts, so that the adjustment when made remains definite and fixed against either forward or backward movement. Furthermore the weight is applied to a support from the rear side of the longitudinal carriage and applied a pressure that not only prevents upward jarring of the said carriage but holds it firmly to its sliding seat so that torsional movement will be prevented. With the carriage 4 having an underbearing as at 5 on the front beam of the lathe bed and through its feed elements, a leverage is present that applies a pressure to the guide ribs of the beams 2 that is greater than the weight by reason of the fact that the support for the weight is at the end of the bracket arm 21 which removes it considerably from the rib on which it fulcrums through the carriage. It will therefore be seen that provision is hereby made that is adapted to be applied to any lathe with the result that whatever lost motion may be present therein will be rendered ineffectual to alter the adjustment.

What I claim is:

1. In a tool adjustment for lathes and the like, the combination with the cross-feed tool carriage and the feed screw thereof, said feed screw being mounted to resist longitudinal movement, of means for applying a force to said carriage in opposition to the forward movement of the same, whereby to take up the play between the carriage and the screw and the longitudinal movement of the screw in its bearings, substantially as described and for the purpose set forth.

2. In a tool adjustment for lathes and the like, the combination with the cross-feed tool carriage and the feed screw thereof, of means movable with said carriage for applying an unvarying force rearwardly thereon and through said carriage to the said feed screw, whereby to take up the play between the carriage and the screw and the longitudinal movement of the screw in its bearings, substantially as described and for the purpose set forth.

3. In a tool adjustment for lathes and the like, the combination with the cross-feed tool carriage and the feed screw thereof, said screw being mounted to resist longitudinal movement thereof, of a weight, suspension means therefor connecting with said carriage and passing over a pulley, and adapted to apply the pull of the weight upon said carriage in a direction opposed to the forward feeding movement, whereby to take up the play between the carriage and screw and the longitudinal movement of the screw in its bearings, substantially as described and for the purpose set forth.

4. In a tool adjustment for lathes and the like, the combination of a carriage movable longitudinally of the lathe bed and adapted to fulcrum on one side of said bed, a cross-feed tool carriage mounted on the longitudinally moving carriage, a feed screw therefor mounted in the longitudinally moving carriage, a weight suspended from the said longitudinally moving carriage, adapted to apply its force thereto through leverage to hold said carriage against other than longitudinal movement, and means whereby said weight is connected to the cross-feed carriage to maintain the same under the pulling force thereof, whereby to take up the play between the carriage and its screw and the longitudinal movement of the screw in its bearings, substantially as described and for the purpose set forth.

5. In a tool adjustment for lathes and the like, the combination with the tool carriage and its feed screw, of an extension provided on said carriage, a weight, and a suspension means therefor connecting with said extension and supported to cause its pull to be parallel thereto and in opposition to the forward movement of the carriage, substantially as described, whereby the pulling force of the weight will take up the play between the carriage and its screw and at the same time any longitudinal movement of the screw in its bearings, as and for the purpose set forth.

In testimony whereof I have hereunto set my hand in presence of two subscribing witnesses.

EBENEZER FISHER.

Witnesses:
HUGH M. STEREING,
GEORGE P. MONTAGUE.